(No Model.)
G. RICKERT.
DYNAMITE HEATER.
No. 589,029. Patented Aug. 31, 1897.
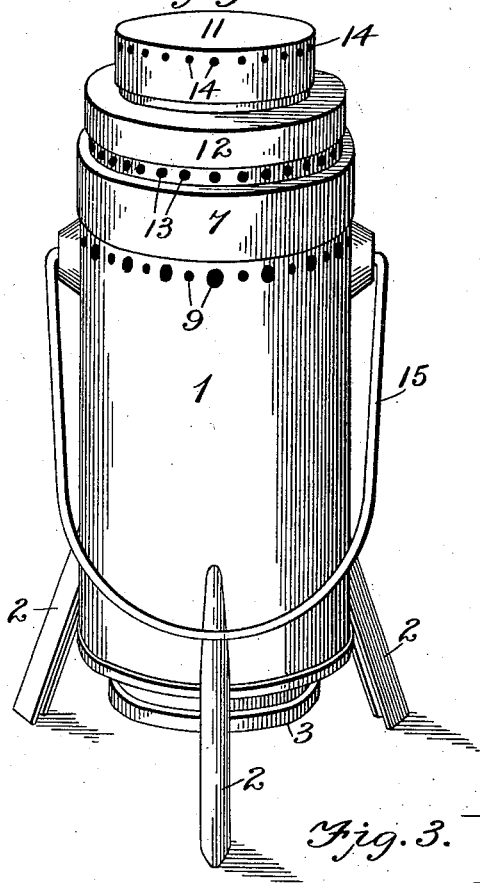
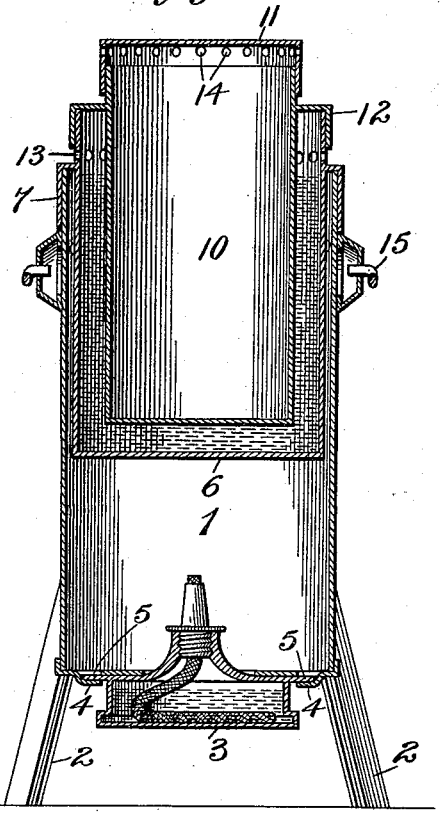
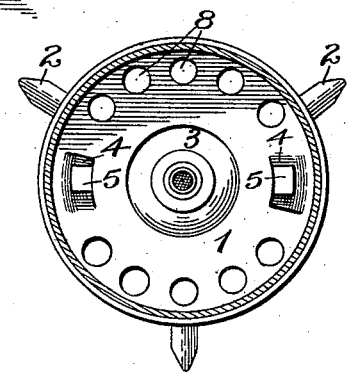
Witnesses
Edwin G. McKee
J. H. Riley
Inventor
George Rickert
By his Attorneys,
C. A. Snow & Co.

UNITED STATES PATENT OFFICE.

GEORGE RICKERT, OF HAZLEBROOK, PENNSYLVANIA.

DYNAMITE-HEATER.

SPECIFICATION forming part of Letters Patent No. 589,029, dated August 31, 1897.

Application filed March 10, 1897. Serial No. 626,816. (No model.)

*To all whom it may concern:*

Be it known that I, GEORGE RICKERT, a citizen of the United States, residing at Hazlebrook, in the county of Luzerne and State of Pennsylvania, have invented a new and useful Dynamite-Heater, of which the following is a specification.

The invention relates to improvements in dynamite-heaters.

The object of the present invention is to improve the construction of dynamite-heaters and to provide a simple, inexpensive, and efficient device which will enable dynamite to be heated to the desired extent without any liability of exploding the same through overheating.

The invention consists in the construction and novel combination and arrangement of parts, as hereinafter fully described, illustrated in the drawings, and pointed out in the claim hereto appended.

In the drawings, Figure 1 is a perspective view of a dynamite-heater constructed in accordance with this invention. Fig. 2 is a vertical sectional view of the same. Fig. 3 is a horizontal sectional view.

Like numerals of reference designate corresponding parts in the several figures of the drawings.

1 designates a cylindrical casing supported by legs 2 and provided at its bottom with an opening, through which projects the burner of a lamp 3, which is detachably secured to the bottom of the casing by resilient tongues 4, formed by L-shaped slits in the bottom of the casing. The burner is provided at opposite sides with horizontally-extending arms 5, which interlock with resilient tongues.

Within the cylindrical casing is arranged a cylindrical boiler 6, which is provided with an exterior annular flange 7, L-shaped in cross-section and forming a cap for the top of the casing. The bottom of the casing is provided with a circular series of perforations 8 for the passage of air, and the casing is also provided with an annular series of perforations 9, located near the upper edge of the casing a sufficient distance therefrom to provide a space for the depending portion of the flange 7. The hot air passes upward and impinges against the boiler, heating the water contained therein, and passes out horizontally through the perforations 9 in order to direct it away from the top of the device, and within the boiler is arranged a dynamite-receptacle 10, having a cover 11 and provided with an annular L-shaped flange 12, which forms a cap for the boiler. The boiler is extended above the annular flange 7 to provide a vertical portion or flange, which has a circular series of perforations 13 to permit the escape of steam horizontally and to direct it away from the top of the device and the hand of the operator, and as water cannot be heated by means of a lamp-stove sufficiently to explode dynamite there is no danger involved in the use of the heater. The receptacle is extended above the flange 12, and the cap 11 is provided with a series of perforations 14 to permit the escape of hot air or gas, and the casing is provided with a hinged bail 15.

The boiler and the dynamite-receptacle are extended above the casing, and the said receptacle, which is of less diameter than the boiler, is extended above the latter, and this arrangement enables the device to be readily handled.

It will be seen that the dynamite-heater is simple and comparatively inexpensive in construction, that it is easily handled, and that it may be employed for heating dynamite without involving the operator in any danger through overheating.

What I claim is—

A device of the class described comprising a casing provided near its top with a horizontal series of perforations, a boiler fitting within the casing and provided with an L-shaped flange engaging over the upper edges of the casing, forming a cap for the same and supporting the boiler, said flange being located above said perforations and being arranged below the upper edge of the boiler to provide a vertical flange, the latter having a horizontal series of perforations 13 and extending above the casing, a dynamite-receptacle arranged within the boiler, extending above the same and provided a short distance from its upper edge with an exterior annular flange 12, fitting over and forming a cap for the boiler and supporting the receptacle in the same, the depending portion of the flange being arranged above the perforations 13, and a cap fitting on the receptacle and provided with a series of perforations, combined with a heating device arranged at the bottom of the casing, substantially as described.

In testimony that I claim the foregoing as my own I have hereto affixed my signature in the presence of two witnesses.

GEORGE RICKERT.

Witnesses:
LEVI HARRIS,
E. E. RICKERT.